US012784136B2

(12) United States Patent
Su

(10) Patent No.: US 12,784,136 B2
(45) Date of Patent: Nov. 3, 2026

(54) METHOD, DEVICE, AND STORAGE MEDIUM FOR GENERATING BINOCULAR STEREOSCOPIC PANORAMIC IMAGE

(71) Applicant: Arashi Vision Inc., Shenzhen (CN)

(72) Inventor: Tan Su, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 106 days.

(21) Appl. No.: 18/830,614

(22) Filed: Sep. 11, 2024

(65) Prior Publication Data

US 2025/0005707 A1 Jan. 2, 2025

Related U.S. Application Data

(63) Continuation of application No. PCT/CN2023/079064, filed on Mar. 1, 2023.

(30) Foreign Application Priority Data

Mar. 11, 2022 (CN) ........................ 202210242661.X

(51) Int. Cl.
*G02B 27/22* (2018.01)
*G06T 3/4038* (2024.01)
*G06T 7/593* (2017.01)

(52) U.S. Cl.
CPC ............ *G06T 3/4038* (2013.01); *G06T 7/593* (2017.01); *G06T 2207/10021* (2013.01); *G06T 2207/20081* (2013.01)

(58) Field of Classification Search
None
See application file for complete search history.

(56) References Cited

U.S. PATENT DOCUMENTS

2006/0227417 A1* 10/2006 Grover .................. G02B 30/27 359/462
2020/0312029 A1* 10/2020 Heinen .................. G06T 7/593

FOREIGN PATENT DOCUMENTS

CN 107545537 A 1/2018
CN 107666606 A 2/2018
CN 111105347 A 5/2020
CN 111429501 A 7/2020
(Continued)

OTHER PUBLICATIONS

Wang et al., "Panoramic Stereo Imaging of a Bionic Compound-Eye Based on Binocular Vision", Sensors, vol. 21, No. 1944, Available Online at: https://doi.org/10.3390/s21061944, pp. 1-20.
(Continued)

*Primary Examiner* — Carl Adams
(74) *Attorney, Agent, or Firm* — XSENSUS LLP

(57) ABSTRACT

A method for generating a binocular stereoscopic panoramic image is provided. The method may include inputting a panoramic image into a predetermined depth estimation model to obtain a depth image corresponding to the panoramic image, the depth image including depth information corresponding to each pixel point in the panoramic image; mapping the panoramic image into a left-eye panoramic image and a right-eye panoramic image based on a preset pupil distance and the depth image; and generating a binocular stereoscopic panoramic image based on the left-eye panoramic image and the right-eye panoramic image.

15 Claims, 7 Drawing Sheets

(56) References Cited

FOREIGN PATENT DOCUMENTS

| | | | |
|---|---|---|---|
| CN | 114742703 | A | 7/2022 |
| JP | 2002-073003 | A | 3/2002 |

OTHER PUBLICATIONS

International Search Report and Written Opinion mailed on Jun. 6, 2023, received for PCT Application PCT/CN2023/079064, filed on Mar. 1, 2023, 9 pages including English Translation.

The First Office Action mailed May 17, 2024, in Chinese Application No. 202210242661.X, 17 pages including English translation.

* cited by examiner

METHOD, DEVICE, AND STORAGE MEDIUM FOR GENERATING BINOCULAR STEREOSCOPIC PANORAMIC IMAGE

CROSS-REFERENCE TO RELATED APPLICATIONS

The present application is a continuation of International Application No. PCT/CN2023/079064, filed on Mar. 1, 2023, which claims the priority of Chinese Patent Application No. CN 202210242661.X, filed on Mar. 11, 2022, the content of each of which is incorporated herein by reference in its entirety.

TECHNICAL FIELD

The present application relates to the technical field of image processing, and in particular to a method, apparatus, device, storage medium and product for generating a binocular stereoscopic panoramic image.

BACKGROUND

With the development of technologies such as Virtual Reality (VR), users have higher and higher requirements for images. In electronic devices such as VR glasses, binocular stereoscopic panoramic images or videos can be shown to the user, displaying images of left and right eyes on the left and right eye screens respectively. The user can get the information with differences between the displayed images to create a sense of three-dimensionality in his mind.

In a traditional method, the electronic device can simultaneously photograph the same object through multiple lenses, stitch the images captured by the multiple lenses into a left-eye panoramic image and a right-eye panoramic image, and combine them to obtain a binocular stereoscopic panoramic image. However, using the above method generally requires professional-grade multi-lenses panoramic photographing equipment, which is complicated to operate and expensive.

At present, ordinary non-stereoscopic panoramic image/video photographing equipment has been very common, and the operation is simple and low-cost, there is an urgent need for a simple and fast method to generate stereoscopic panoramic image/video directly through the ordinary non-stereoscopic panoramic image/video.

SUMMARY

Some embodiments of the present disclosure provide a generation method, apparatus, device, storage medium and product for generating a stereoscopic panoramic image/video directly from an ordinary non-stereoscopic panoramic image/video, in response to the above technical problem or others.

In one aspect, one embodiment of the present disclosure provides a method for generating a binocular stereoscopic panoramic image. The method may comprise inputting a panoramic image into a predetermined depth estimation model to obtain a depth image corresponding to the panoramic image, the depth image including depth information corresponding to each pixel point in the panoramic image; mapping the panoramic image into a left-eye panoramic image and a right-eye panoramic image based on a preset pupil distance and the depth image; and generating a binocular stereoscopic panoramic image based on the left-eye panoramic image and the right-eye panoramic image.

In another aspect, another embodiment of the present disclosure provides a device for generating a binocular stereoscopic panoramic image. The device may include obtaining circuitry to input a panoramic image into a predetermined depth estimation model to obtain a depth image corresponding to the panoramic image; the depth image includes depth information corresponding to each pixel point in the panoramic image; mapping circuitry to map the panoramic image into a left-eye panoramic image and a right-eye panoramic image based on a preset pupil distance and the depth image; and generating circuitry to generate a binocular stereo panoramic image based on the left-eye panoramic image and the right-eye panoramic image.

In another aspect, another embodiment of the present disclosure provides an electronic device comprising a memory and a processor, the memory storing a computer program, wherein the processor, when executing the computer program, implements steps of: inputting a panoramic image into a predetermined depth estimation model to obtain a depth image corresponding to the panoramic image, the depth image including depth information corresponding to each pixel point in the panoramic image; mapping the panoramic image into a left-eye panoramic image and a right-eye panoramic image based on a preset pupil distance and the depth image; and generating a binocular stereoscopic panoramic image based on the left-eye panoramic image and the right-eye panoramic image.

In another aspect, another embodiment of the present disclosure provides a computer-readable storage medium having stored thereon a computer program, wherein the computer program when executed by a processor implements steps of: inputting a panoramic image into a predetermined depth estimation model to obtain a depth image corresponding to the panoramic image, the depth image including depth information corresponding to each pixel point in the panoramic image; mapping the panoramic image into a left-eye panoramic image and a right-eye panoramic image based on a preset pupil distance and the depth image; and generating a binocular stereoscopic panoramic image based on the left-eye panoramic image and the right-eye panoramic image.

In some embodiments, since the electronic device can acquire the depth image of the panoramic image, the panoramic image can be mapped into the left-eye panoramic image and the right-eye panoramic image according to the depth image and the preset pupil distance to obtain the binocular stereoscopic panoramic image, which makes it possible for the electronic device to complete the mapping conversion between the panoramic image and the binocular stereoscopic panoramic image. Accordingly, there is no need to acquire the binocular panoramic stereoscopic image with the specialized multi-lenses panoramic photographing equipment, thereby reducing the cost of the electronic device and having simple operation.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure.

Ordinary person skilled in the art may obtain other drawings and features based on these disclosed drawings without inventive efforts.

DETAILED DESCRIPTION

In order to make the purpose, technical solutions and advantages of the present application more clearly understood, the following is a further detailed description of the present application in conjunction with the accompanying drawings and embodiments. It should be understood that the specific embodiments described herein are only for the purpose of explaining the present application and are not intended to limit the present application.

A method for generating a binocular stereoscopic panoramic image provided in one embodiment of the present application can be applied to an electronic device, and the electronic device can process a panoramic image to obtain a binocular stereoscopic panoramic image corresponding to the panoramic image. The aforementioned electronic device may be, but is not limited to, various personal computers, laptops, smartphones, tablets, and portable wearable devices. The above electronic device may also be an imaging device such as a camera, a camcorder, and the like; the above camera may be, but is not limited to, an ordinary camera, a pocket camera, a shake-proof camera, a Virtual Reality (VR) panoramic camera, a sports camera, or a consumer-grade or professional-grade panoramic camera, and the like.

Figure 1:
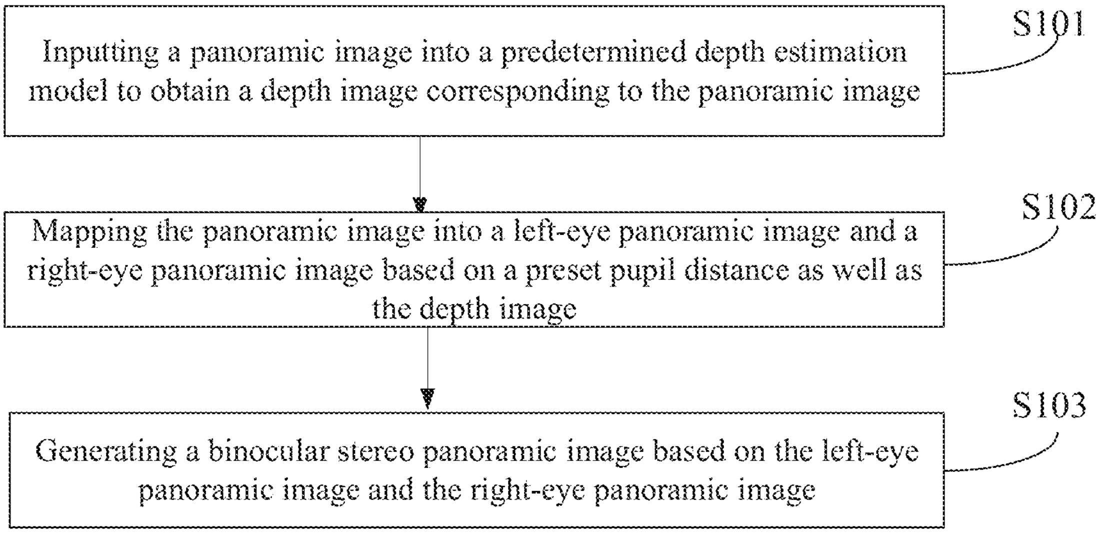
FIG. 1 shows a flow diagram of a method for generating a binocular stereoscopic panoramic image according to one embodiment of the present disclosure.

In one embodiment, as shown in FIG. 1, a method for generating a binocular stereoscopic panoramic image is provided, illustrated as an example of the method being applied to an electronic device, comprising:

S101: inputting a panoramic image into a predetermined depth estimation model to obtain a depth image corresponding to the panoramic image; the depth image includes depth information corresponding to each pixel point in the panoramic image.

The panoramic image may be an image acquired by the electronic device via photographing, or may be an image stored in the electronic device, without limitation herein. The panoramic image acquired via photographing by the electronic device may be an image captured by the electronic device by means of a panoramic camera, or may be an image frame in a video captured by the electronic device, without limitation herein. When the above panoramic image is an image stored in the electronic device, it may be stored in the electronic device in an image format, or it may be a video frame in a stored video. For example, the above electronic device may be a VR glass, and the above panoramic image may be a panoramic image input to the VR glass to be played.

The camera of the aforementioned electronic device may be a dual fisheye panoramic camera, wherein the electronic device may capture the panoramic image in such a way that any one angle may be covered by a field of view of one of the lenses in the dual fisheye panoramic camera. The electronic device may stitch the images captured by the different lenses to obtain a panoramic image.

The above depth estimation model may be a neural network model, and the above depth estimation model may be used to extract depth information of each pixel point in the panoramic image, and generate a depth image corresponding to the panoramic image based on the depth information corresponding to each pixel point. Wherein the above depth information is a distance between an object represented by a pixel point in the image and a center of the camera when the panoramic image is taken.

The electronic device may input the panoramic image into the depth estimation model described above, or may preprocess the panoramic image before inputting it into the depth estimation model, without limitation herein. For example, the pre-processing operation of the electronic device on the panoramic image may include down-sampling the panoramic image, changing a projection method of the panoramic image, changing brightness or contrast of the panoramic image, and/or converting the panoramic image into a single-channel grayscale map. The above depth estimation model may output a depth image corresponding to the panoramic image, and a dimension of the above depth image may be equal to that of the panoramic image or may be smaller than that of the panoramic image, without limitation herein.

The above depth image and the above panoramic image may use the same panoramic projection, and the above panoramic projection may be a spherical projection or an isometric cylindrical projection, without limitation herein.

S102, mapping the panoramic image into a left-eye panoramic image and a right-eye panoramic image based on a preset pupil distance as well as the depth image.

On the basis of obtaining the depth image, the electronic device may map the panoramic image into a left-eye panoramic image and a right-eye panoramic image, such that the parallax generated by the left-eye panoramic image and the right-eye panoramic image corresponds to the depth image.

When the user views the left panoramic image with the left eye and the right panoramic image with the right eye at the same time, there is a difference in the position of the same object in the left eye and the right eye, which is also known as parallax. The larger the parallax, the closer the user perceives the object; the smaller the parallax, the farther the user perceives the object.

After the electronic device maps the panoramic image into a corresponding left-eye panoramic image and a right-eye panoramic image, such that the distance perceived by the user through the parallax generated by the above-described binocular stereoscopic panoramic image corresponds to the above-described depth image. For example, the above panoramic image includes an object A, and the depth information corresponding to the object A in the depth image obtained by the depth estimation model is H; after the electronic device maps the panoramic image into a left-eye panoramic image and a right-eye panoramic image based on the above depth image, the user can perceive the distance of the object A from the user through the left-eye panoramic image and the right-eye panoramic image, and the distance corresponds to the depth information H.

Specifically, the electronic device may use an omni-directional stereo (ODS) projection method to map the panoramic image into a left-eye panoramic image and a right-eye panoramic image.

S103, generating a binocular stereo panoramic image based on the left-eye panoramic image and the right-eye panoramic image.

The electronic device can form a binocular stereoscopic panoramic image from the above-described left-eye panoramic image and the right-eye panoramic image on the basis of obtaining the above-described left-eye panoramic image and the right-eye panoramic image.

In the above-described method for generating a binocular stereoscopic panoramic image, the electronic device inputs the panoramic image into a predetermined depth estimation model to obtain a depth image corresponding to the panoramic image; then, according to the depth image and a preset pupil distance, the panoramic image is mapped into a left-eye panoramic image and a right-eye panoramic image; and a binocular stereoscopic panoramic image is generated based on the left-eye panoramic image and the right-eye panoramic image; wherein, the above-described depth image includes depth information corresponding to each pixel point in the panoramic image. Since the electronic device can acquire the depth image of the panoramic image, the panoramic image can be mapped into the left-eye panoramic image and the right-eye panoramic image according to the depth image and the preset pupil distance to obtain the binocular stereoscopic panoramic image, which makes it possible for the electronic device to complete the mapping conversion between the panoramic image and the binocular stereoscopic panoramic image. Accordingly, there is no need to complete acquisition of the binocular panoramic stereoscopic image with the specialized multi-lenses panoramic photographing equipment, thereby reducing the cost of electronic equipment, and the operation is simple.

Figure 2:
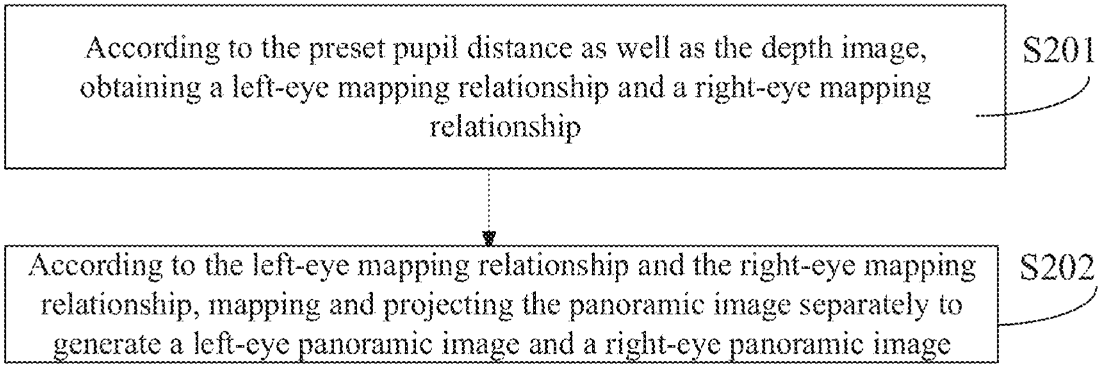
FIG. 2 shows a flow diagram of a method for generating a binocular stereoscopic panoramic image according to one embodiment of the present disclosure.

FIG. 2 shows a flow diagram of a partial method for generating a binocular stereoscopic panoramic image in an embodiment. This embodiment relates to a way for an electronic device to map a panoramic image into a left-eye panoramic image and a right-eye panoramic image, and on the basis of the above embodiment, as shown in FIG. 2, the above S102 comprises:

S201, according to the preset pupil distance as well as the depth image, obtaining a left-eye mapping relationship and a right-eye mapping relationship; the left-eye mapping relationship includes a correspondence between a first coordinate of a pixel point in the panoramic image and a second coordinate of the pixel point in the panoramic screen of the left eye; and the right-eye mapping relationship includes a correspondence between the first coordinate and a third coordinate of the pixel point in the panoramic screen of the right eye.

Wherein, the above pupil distance may be used to characterize the distance between the pupil of the user's left eye and the pupil of the user's right eye. In one embodiment, a preset value of the pupil distance may be stored in the electronic device, and the preset value is employed to map the above panoramic image.

In another embodiment, the electronic device may adopt different pupil distances for different users; the electronic device may preset the correspondence between different user accounts and pupil distances, and the pupil distance in the above correspondence may be input by the user, or selected by the user in a plurality of preset values, or obtained by the electronic device based on the extraction of the user's image, and no limitation will be made herein with respect to the acquisition method of the above pupil distance. For example, when the user is using the electronic device, the image acquisition can be performed through the electronic device or a terminal such as a cellular phone connected to the electronic device, and the above image acquisition process can be in the process of user registration or in the process of logging in, and no limitation is made herein.

In another embodiment, different types of electronic devices may correspond to different pupil distances. For example, the aforementioned electronic device may be a VR glass, a smart helmet, etc., and different pupil distances may be used for different electronic devices to meet the mapping needs of the binocular stereoscopic panoramic image of the electronic device.

On the basis of obtaining the pupil distance as well as the depth image, the electronic device can obtain the left-eye mapping relation and the right-eye mapping relation corresponding to this panoramic image based on an ODS mapping method.

Figure 3:
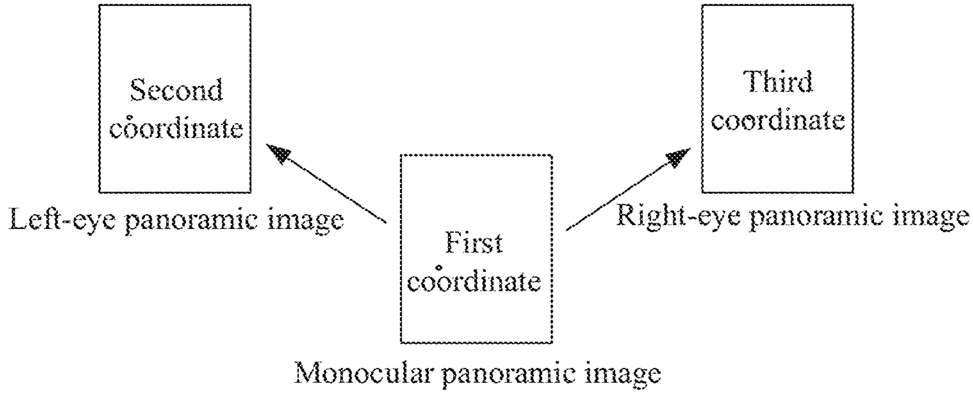
FIG. 3 shows a schematic diagram of a method for generating a binocular stereoscopic panoramic image according to one embodiment of the present disclosure.

The above mapping relationships are coordinate correspondences. For the pixel point in the panoramic image, it may be mapped to the left-eye panoramic screen and the right-eye panoramic screen respectively. The coordinate of the above pixel point in the panoramic image may be a first coordinate, the coordinate in the left-eye panoramic screen may be a second coordinate, and the coordinate in the right-eye panoramic screen may be a third coordinate, as shown in FIG. 3. The above left-eye mapping relationship is a correspondence between the first coordinate and the second coordinate of each pixel point in the panoramic image, and the above right-eye mapping relationship is a correspondence between the first coordinate and the third coordinate of each pixel point in the panoramic image.

S202, according to the left-eye mapping relationship and the right-eye mapping relationship, mapping and projecting the panoramic image separately to generate a left-eye panoramic image and a right-eye panoramic image.

After obtaining the above-described left-eye mapping relationship and the right-eye mapping relationship, the electronic device can determine to which position the pixel point in the panoramic image is mapped, and thus determine the coordinates of the respective pixel point in the left-eye panoramic image and the right-eye panoramic image. After matching each of the above-described second coordinates to a corresponding pixel value, the left-eye panoramic image is obtained. After matching each of the above-described third coordinates to a corresponding pixel value, the right-eye panoramic image is obtained.

In the above-described method for generating a binocular stereoscopic panoramic image, the electronic device obtains a left-eye mapping relationship and a right-eye mapping relationship on a basis of a pupil distance and a depth image and can accurately map the panoramic image into a binocular stereoscopic panoramic image, so that the binocular stereoscopic panoramic image can present a stereoscopic effect that corresponds to the depth information of that panoramic image.

Figure 4:
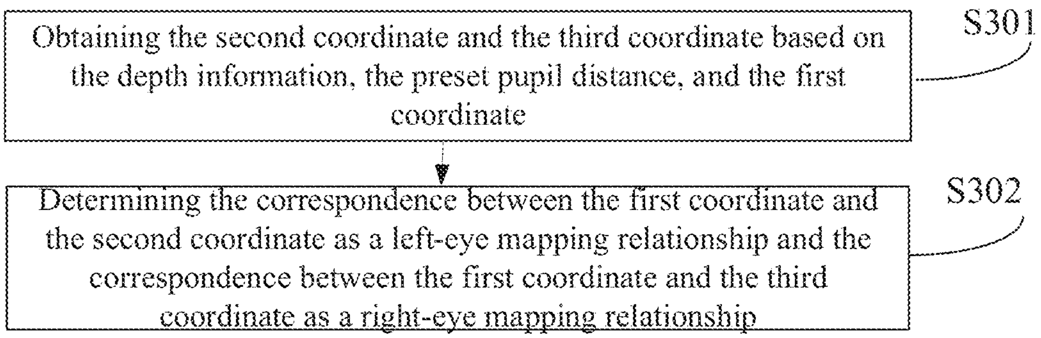
FIG. 4 shows a flow diagram of a method for generating a binocular stereoscopic panoramic image according to one embodiment of the present disclosure.

FIG. 4 shows a flow diagram of a method for generating a binocular stereo panoramic image in an embodiment, which relates to a way of an electronic device obtaining a left-eye mapping relationship and a right-eye mapping relationship, on the basis of the above embodiment, as shown in FIG. 4, the above S201 comprises:

S301, obtaining the second coordinate and the third coordinate based on the depth information, the preset pupil distance, and the first coordinate.

The above first coordinate, the second coordinate, and the third coordinate may be spherical coordinates or three-dimensional planar coordinates, and are not limited herein. The electronic device may perform coordinate mapping according to a predetermined formula to calculate the second and third coordinates corresponding to each first coordinate.

In one embodiment, the individual pixel points in the above panoramic image and the above depth image may be represented using spherical coordinates; that is, the coordinate of each pixel point may comprise a longitude coordinate and a latitude coordinate.

The above predetermined formula may include a longitude coordinate calculation formula and a latitude coordinate calculation formula. Wherein, the longitude coordinates in the above second coordinate and the third coordinate may be related to the depth information, the preset pupil distance, and the longitude coordinate in the first coordinate. For the same first coordinate, the longitude coordinate of the corresponding second coordinate is different from the longitude coordinate of the corresponding third coordinate. The difference between the longitude coordinate of the above second coordinate and the longitude coordinate of the third coordinate may be obtained from the ratio of the pupil distance to the depth information corresponding to that coordinate. Since the parallax generated by the panoramic image of the left eye and the panoramic image of the right eye for generating the distance information is mainly related to the longitude coordinates, the electronic device can directly determine the latitude coordinate in the first coordinate as the latitude coordinate in the second coordinate and the latitude coordinate in the third coordinate, respectively.

For the second coordinate, the electronic device may calculate the longitude coordinate in the second coordinate according to the formula $$L_\phi(\phi, \theta) = \phi + \arcsin\left(\frac{p}{2 \cdot D(\phi, \theta)}\right),$$

and determining the latitude coordinate in the first coordinate as the latitude coordinate in the second coordinate. $\phi$ is the longitude coordinate in the first coordinate; $\theta$ is the latitude coordinate in the first coordinate, and $D(\phi, \theta)$ is the depth information corresponding to the first coordinate in the depth image, the $L_\phi(\phi, \theta)$ is the longitude coordinate in the second coordinate corresponding to the first coordinate, and p is the preset pupil distance.

For the third coordinate, the electronic device may calculate the longitude coordinate in the third coordinate according to the formula $$R_\phi(\phi, \theta) = \phi - \arcsin\left(\frac{p}{2 \cdot D(\phi, \theta)}\right)$$

and determining the latitude coordinate in the first coordinate as the latitude coordinate in the third coordinate. $\phi$ is the longitude coordinate in the first coordinate; $\theta$ is the latitude coordinate in the first coordinate. $D(\phi, \theta)$ is the depth information corresponding to the first coordinate in the depth image, the $R_\phi(\phi, \theta)$ is the longitude coordinate in the third coordinate corresponding to the first coordinate, and p is the preset pupil distance.

That is, the above predetermined formula for calculating the latitude coordinates may be:

$$R_\theta(\phi, \theta) = L_\theta(\phi, \theta) = \theta$$

where $L_\theta(\phi, \theta)$ is the longitude coordinate in the second coordinate corresponding to the first coordinate, and $R_\theta(\phi, \theta)$ is the longitude coordinate in the third coordinate corresponding to the first coordinate.

S302, determining the correspondence between the first coordinate and the second coordinate as a left-eye mapping relationship and the correspondence between the first coordinate and the third coordinate as a right-eye mapping relationship.

On the basis of obtaining the second coordinate and the third coordinate, the electronic device may determine the correspondence between the first coordinate and the second coordinate of each pixel point as a left-eye mapping relationship, and determine the correspondence between the first coordinate and the third coordinate as a right-eye mapping relationship.

The above-described method for generating a binocular stereoscopic panoramic image, wherein the electronic device uses spherical coordinates to accomplish coordinate mapping, can be applied to a panoramic image in any projection mode, thereby improving the applicability of mapping a panoramic image to a binocular stereoscopic panoramic image.

Figure 5:
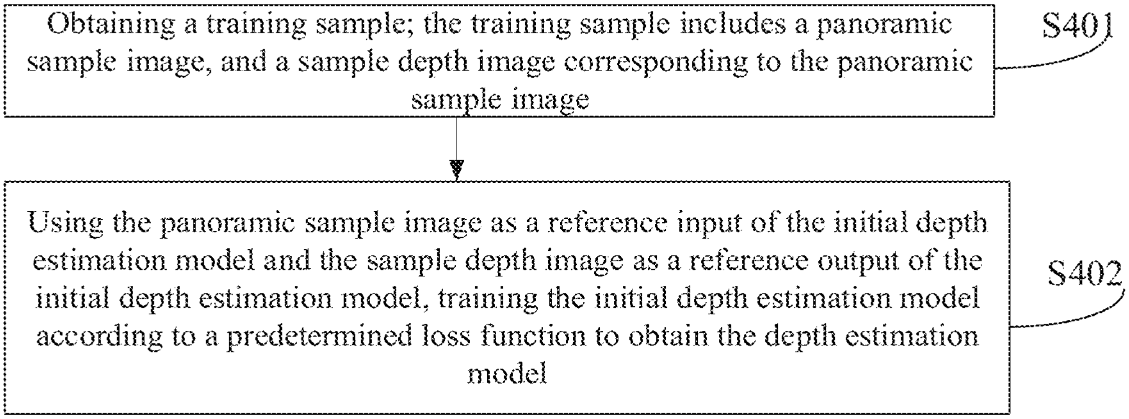
FIG. 5 shows a flow diagram of a method for generating a binocular stereoscopic panoramic image according to one embodiment of the present disclosure.

FIG. 5 shows a flow diagram of a method for generating a binocular stereoscopic panoramic image in an embodiment, which relates to an implementation of a depth estimation model, and on the basis of the above embodiment, as shown in FIG. 5, the above method further comprises:

S401, obtaining a training sample; the training sample includes a panoramic sample image, and a sample depth image corresponding to the panoramic sample image.

The electronic device may acquire a binocular stereoscopic panoramic sample image, and then extract depth information from the binocular stereoscopic panoramic sample image to obtain a sample depth image corresponding to the binocular stereoscopic panoramic sample image; furthermore, the electronic device may carry out monocularization of the abovementioned binocular stereoscopic panoramic sample image to obtain a panoramic sample image corresponding to the binocular stereoscopic panoramic sample image. The above panoramic sample image and its corresponding sample depth image constitute a training sample.

In another embodiment, a binocular stereoscopic panoramic camera and a monocular panoramic camera may be used to simultaneously photograph for the same scene, obtain a binocular stereoscopic panoramic sample image and a panoramic sample image, respectively, and then obtain the aforementioned training sample after generating a sample depth image based on the binocular stereoscopic panoramic sample image.

S402: using the panoramic sample image as a reference input of the initial depth estimation model and the sample depth image as a reference output of the initial depth estimation model, training the initial depth estimation model according to a predetermined loss function to obtain the depth estimation model.

On the basis of obtaining the training samples, the electronic device may take the panoramic sample image as a reference input of the initial depth estimation model, take the sample depth image as a reference output of the initial depth estimation model, and train the initial depth estimation model according to a predetermined loss function to obtain the depth estimation model.

The above-described method for generating a binocular stereoscopic panoramic image can obtain a depth estimation model through sample training, so that a depth image of the panoramic image can be obtained according to the depth estimation model, which provides a data base for mapping from the panoramic image to the binocular stereoscopic panoramic image.

Figure 6:
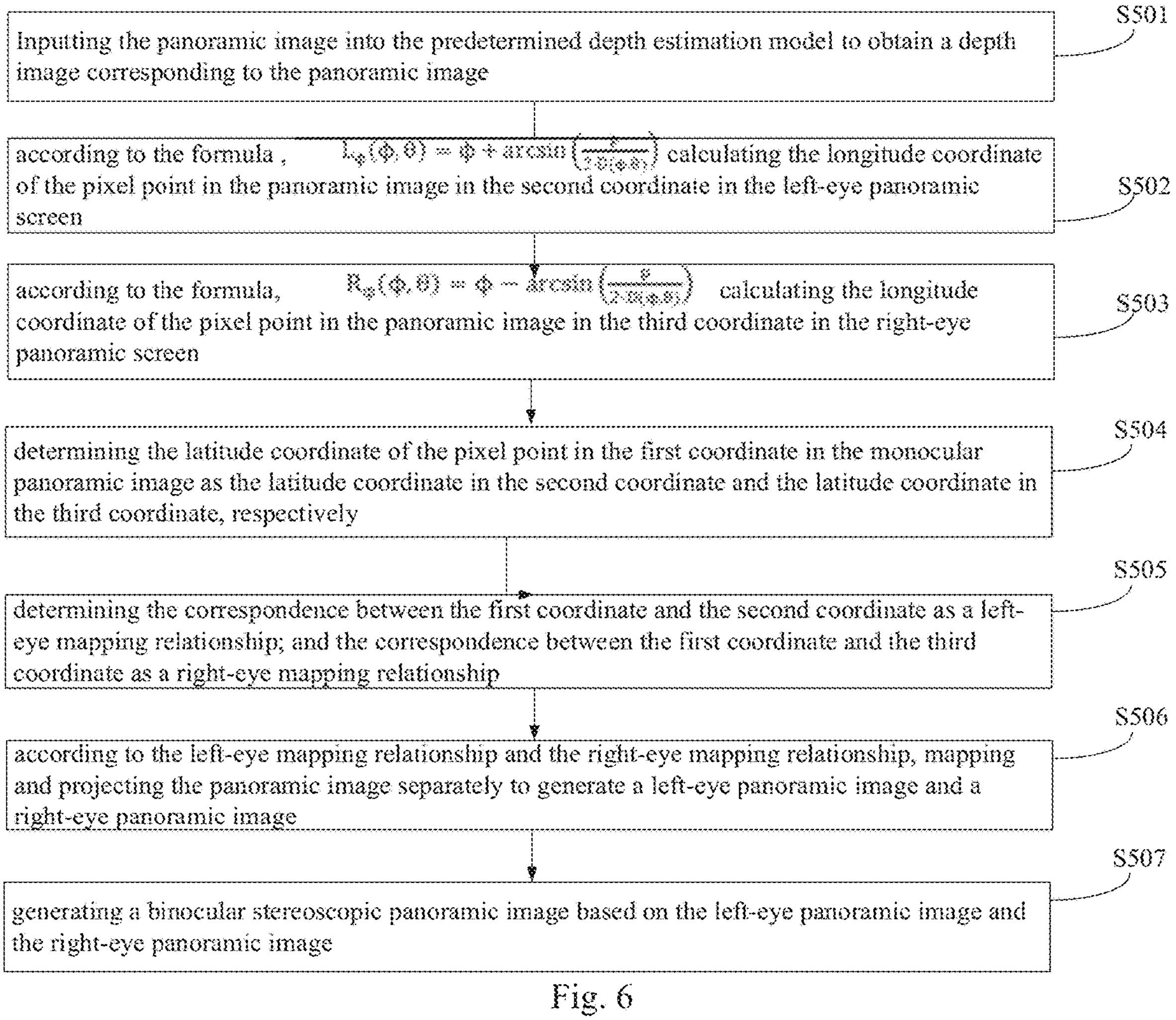
FIG. 6 shows a flow diagram of a method for generating a binocular stereoscopic panoramic image according to one embodiment of the present disclosure.

In one embodiment, a method of generating a binocular stereoscopic panoramic image is provided, as shown in FIG. 6, the method comprising:

S501, inputting the panoramic image into the predetermined depth estimation model to obtain a depth image corresponding to the panoramic image;

S502, according to the formula $$L_{\phi}(\phi, \theta) = \phi + \arcsin\left(\frac{p}{2 \cdot D(\phi, \theta)}\right),$$

calculating the longitude coordinate of the pixel point in the panoramic image in the second coordinate in the left-eye panoramic screen;

S503, according to the formula $$R_{\phi}(\phi, \theta) = \phi - \arcsin\left(\frac{p}{2 \cdot D(\phi, \theta)}\right),$$

calculating the longitude coordinate of the pixel point in the panoramic image in the third coordinate in the right-eye panoramic screen;

S504, determining the latitude coordinate of the pixel point in the first coordinate in the monocular panoramic image as the latitude coordinate in the second coordinate and the latitude coordinate in the third coordinate, respectively;

S505, determining the correspondence between the first coordinate and the second coordinate as a left-eye mapping relationship; and the correspondence between the first coordinate and the third coordinate as a right-eye mapping relationship;

S506, according to the left-eye mapping relationship and the right-eye mapping relationship, mapping and projecting the panoramic image separately to generate a left-eye panoramic image and a right-eye panoramic image; and

S507, generating a binocular stereoscopic panoramic image based on the left-eye panoramic image and the right-eye panoramic image.

The above method of generating a binocular stereoscopic panoramic image, the technical principles and embodiment effects of which can be seen in the above embodiments, will not be repeated herein.

It should be understood that although the individual steps in the flowcharts involved in the embodiments as described above are shown sequentially as indicated by the arrows, these steps are not necessarily executed sequentially in the order indicated by the arrows. Unless expressly stated herein, there is no strict order limitation on the execution of these steps, and these steps may be executed in other orders. Moreover, at least a portion of the steps in the flowchart involved in the embodiments as described above may include multiple steps or multiple phases, which are not necessarily executed to completion at the same moment but may be executed at different moments, and the order in which these steps or phases are executed is not necessarily sequential but may be performed in conjunction with at least a portion of the other steps or of at least a portion of the steps or phases in the other steps. steps or stages are not necessarily performed in sequence, but may be performed in turn or alternately with other steps or at least parts of other steps.

In one embodiment, a method for generating a binocular stereoscopic panoramic video is provided, and the electronic device may adopt the above-described method for generating binocular stereoscopic panoramic images to generate binocular stereoscopic panoramic images based on each of the individual panoramic images in the panoramic video, respectively; and then, based on each of the individual binocular stereoscopic panoramic images, a binocular stereoscopic panoramic video is generated.

The above method of generating a binocular stereoscopic panoramic video, the embodiment principle and technical effect of which are described in the above embodiment of the method of generating a binocular stereoscopic panoramic image, will not be repeated herein.

Based on the same inventive concept, some embodiments of the present application also provide a device for generating a binocular stereoscopic panoramic image for realizing the method for generating binocular stereoscopic panoramic images as described above. The embodiment scheme for solving the problem provided by the device is similar to the embodiment scheme documented in the above-described method, so the specific limitations in the one or more embodiments of the device for generating binocular stereoscopic panoramic images provided below can be found in the limitations for the method for generating binocular stereoscopic panoramic images described above, and will not be repeated herein.

Figure 7:
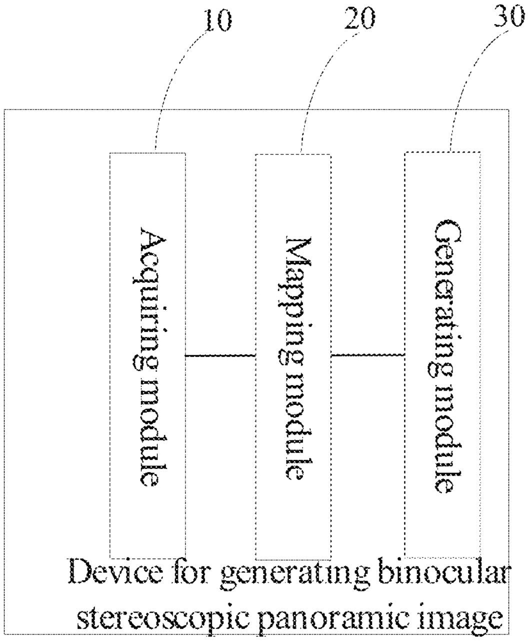
FIG. 7 shows a block diagram of a structure of a device for generating a binocular stereoscopic panoramic image according to one embodiment of the present disclosure.

In one embodiment, as shown in FIG. 7, there is provided a device for generating a binocular stereo panoramic image comprising:

an acquiring module or circuitry 10 for inputting the panoramic image into the predetermined depth estimation model to obtain a depth image corresponding to the panoramic image; the depth image includes depth information corresponding to each pixel point in the panoramic image;

a mapping module or circuitry 20 for mapping the panoramic image into a left-eye panoramic image and a right-eye panoramic image based on the predetermined pupil distance as well as the depth image;

a generating module or circuitry 30 for generating a binocular stereo panoramic image based on the left-eye panoramic image and the right-eye panoramic image.

Figure 8:
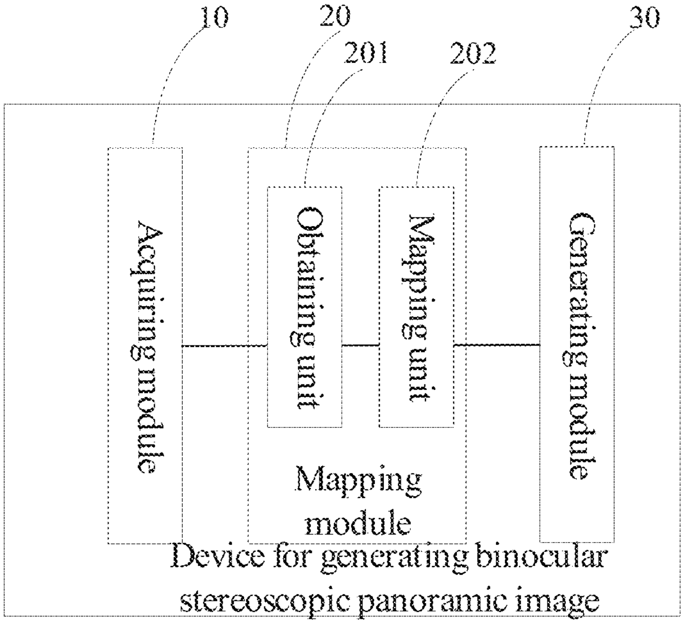
FIG. 8 shows a block diagram of a structure of a device for generating a binocular stereoscopic panoramic image according to one embodiment of the present disclosure.

In one embodiment, based on the above embodiment, as shown in FIG. 8, the above mapping module 20 comprises:

an obtaining unit 201 for obtaining a left-eye mapping relationship and a right-eye mapping relationship based on a preset pupil distance as well as a depth image; the left-eye mapping relationship comprises a correspondence between a first coordinate of a pixel point in the panoramic image and a second coordinate of the pixel point in the left-eye panoramic image; the right-eye mapping relationship comprises a correspondence between the first coordinate and a third coordinate of the pixel point in the right-eye panoramic image;

a mapping unit 202 for generating a left-eye panoramic image and a right-eye panoramic image by mapping the panoramic image for projection according to the left-eye mapping relationship and the right-eye mapping relationship, respectively.

Figure 9:
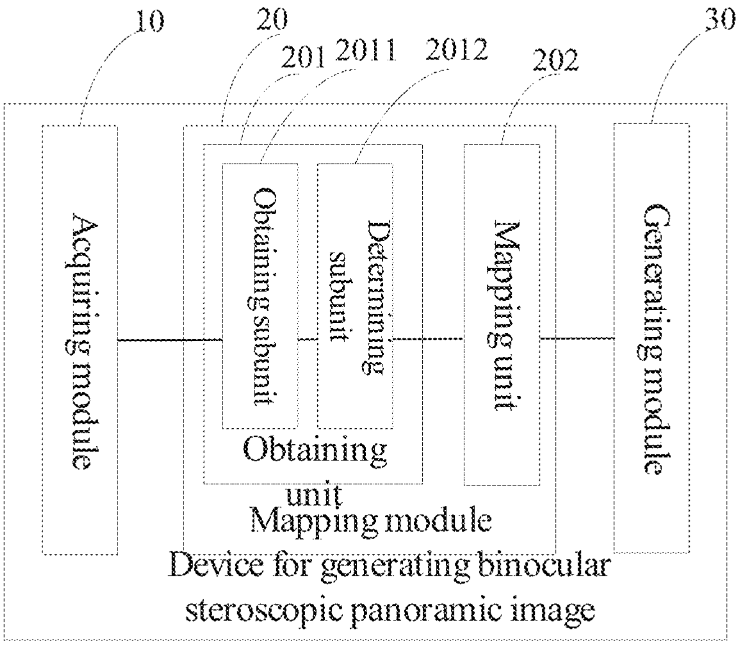
FIG. 9 shows a block diagram of a structure of a device for generating a binocular stereoscopic panoramic image according to one embodiment of the present disclosure.

In one embodiment, based on the above embodiment, as shown in FIG. 9, the above obtaining unit 201 comprises:

an obtaining subunit 2011 for obtaining a second coordinate and a third coordinate based on the depth information, the preset pupil distance, and the first coordinate; and a determining subunit 2012 for determining a correspondence between the first coordinate and the second coordinate as a left-eye mapping relationship; and determining a correspondence between the first coordinate and the third coordinate as a right-eye mapping relationship.

In one embodiment, on the basis of the above embodiment, the above obtaining subunit 2011 is specifically for: according to the formula $$L_{\phi}(\phi, \theta) = \phi + \arcsin\left(\frac{p}{2 \cdot D(\phi, \theta)}\right)$$

calculating the longitude coordinate in the second coordinate; determining the latitude coordinate in the first coordinate as the latitude coordinate in the second coordinate; wherein $\phi$ is the longitude coordinate in the first coordinate; $\theta$ is the latitude coordinate in the first coordinate, and $D(\phi, \theta)$ is the depth information corresponding to the first coordinate in the depth image, the $L_{\phi}(\phi, \theta)$ is the longitude coordinate in the second coordinate corresponding to the first coordinate, and p is a preset pupil distance.

In one embodiment, on the basis of the above embodiment, the above obtaining subunit 2011 is specifically for: according to the formula $$R_{\phi}(\phi, \theta) = \phi - \arcsin\left(\frac{p}{2 \cdot D(\phi, \theta)}\right)$$

calculating the longitude coordinate in the third coordinate; determining the latitude coordinate in the first coordinate as the latitude coordinate in the third coordinate; wherein $\phi$ is the longitude coordinate in the first coordinate; $\theta$ is the latitude coordinate in the first coordinate, and $D(\phi, \theta)$ is the depth information corresponding to the first coordinate in the depth image, the $R_{\phi}(\phi, \theta)$ is the longitude coordinate in the third coordinate corresponding to the first coordinate, and p is a preset pupil distance.

Figure 10:
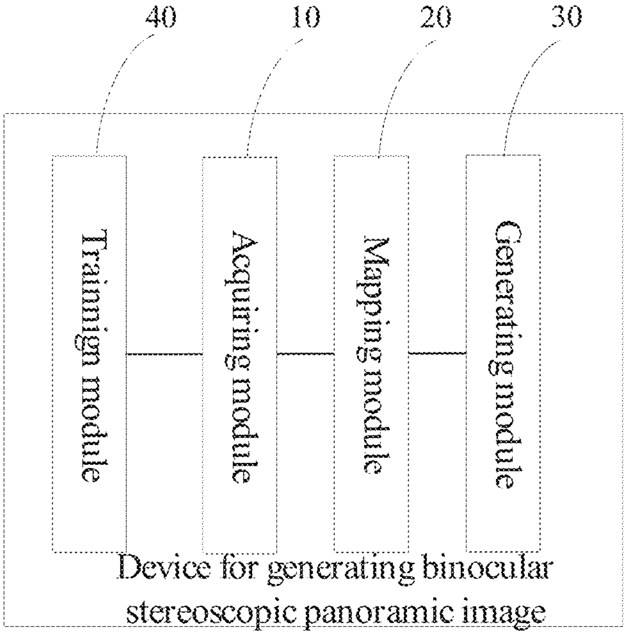
FIG. 10 shows a block diagram of a structure of a device for generating a binocular stereoscopic panoramic image according to one embodiment of the present disclosure.

In one embodiment, on the basis of the above embodiment, as shown in FIG. 10, the above device further comprises a training module or circuitry 40 for: obtaining a training sample; the training sample comprises a panoramic sample image, and a sample depth image corresponding to the panoramic sample image; taking the panoramic sample image as a reference input of the initial depth estimation model, and the sample depth image as a reference output of the initial depth estimation model, and the initial depth estimation model is trained according to a predetermined loss function to obtain the depth estimation model.

The above-described device for generating a binocular stereoscopic panoramic image, the technical principles and embodiment effects of which can be found in the above-described method embodiments, will not be repeated herein.

The various modules in the above-described binocular stereoscopic panoramic image generating device may be realized in whole or in part by means of software, hardware and combinations thereof. Each of the above-described modules may be embedded in or independent of a processor in a computer device in the form of hardware, or may be stored in a memory in the computer device in the form of software, so as to facilitate the processor to invoke the execution of the operations corresponding to each of the above-described modules.

Figure 11:
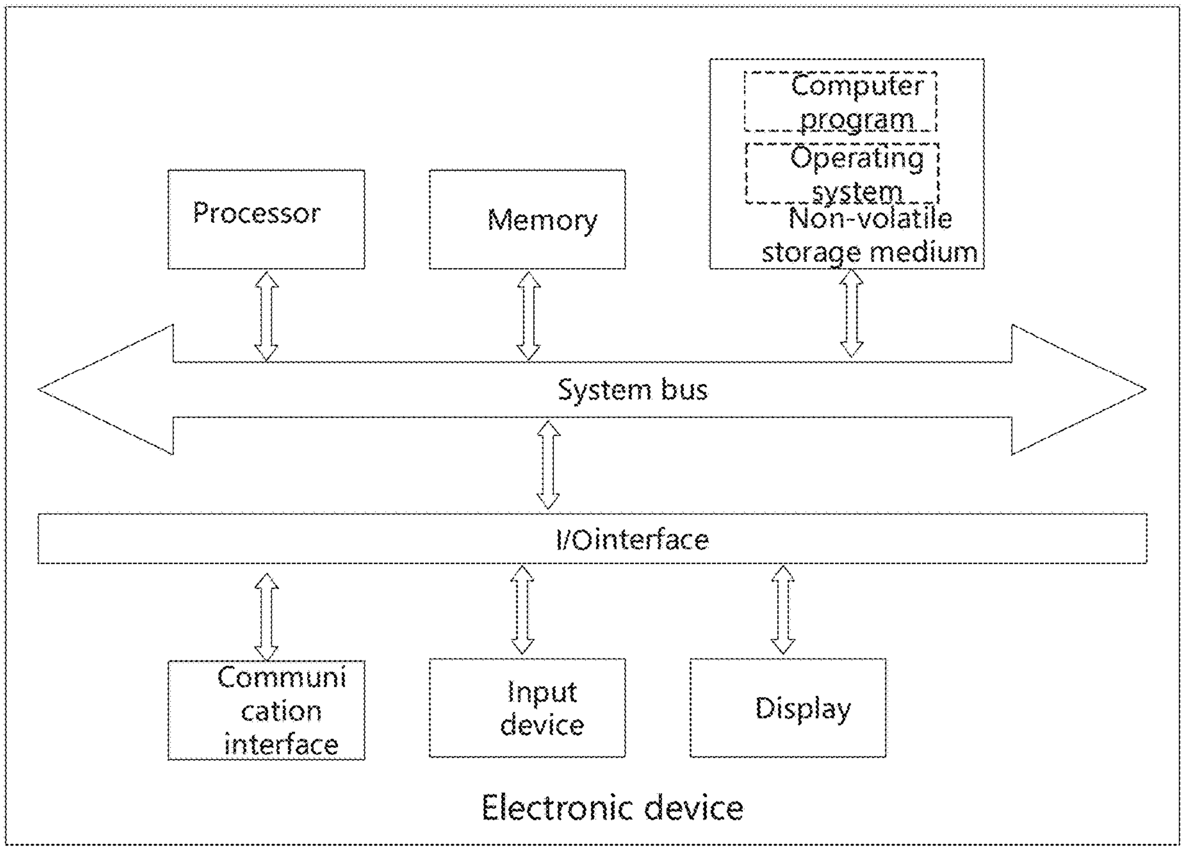
FIG. 11 shows an internal structure of an electronic device according to one embodiment of the present disclosure.

In one embodiment, an electronic device is provided, the internal structure diagram of which may be shown in FIG. 11. The electronic device includes a processor connected via a system bus, a memory, a communication interface, a display and an input device. The processor of the electronic device is used to provide computing and control capabilities. The memory of the electronic device includes a non-volatile storage medium, an internal memory. The non-volatile storage medium stores an operating system and a computer program. The internal memory provides an environment for the operation of the operating system and the computer program in the non-volatile storage medium. The communication interface of the electronic device is used to communicate with an external terminal in a wired or wireless manner, the wireless manner being realized through WIFI, mobile cellular network, Near Field Communication (NFC) or other technologies. The computer program is executed by a processor to implement a method for generating a binocular stereoscopic panoramic image. The display of the electronic device may be a liquid crystal display or an e-ink display, and the input device of the electronic device may be a touch layer covered on the display, a button, a trackball, or a touchpad provided on the housing of the electronic device, an external keyboard, a touchpad, or a mouse, and the like.

It will be understood by those skilled in the art that the structure illustrated in FIG. 11, which is only a block diagram of a portion of the structure related to the present application embodiment, does not constitute a limitation on the computer apparatus to which the present application embodiment is applied, and that a specific computer apparatus may include more or fewer components than those shown in the drawings, or may combine some of the components, or may have a different arrangement of components.

In one embodiment, there is provided an electronic device comprising a memory and a processor, the memory storing a computer program, the processor executing the computer program realizing the following steps:

Inputting a panoramic image into a predetermined depth estimation model to obtain a depth image corresponding to the panoramic image, the depth image including depth information corresponding to each pixel point in the panoramic image;

based on the preset pupil distance as well as the depth image, mapping the panoramic image into a left-eye panoramic image and a right-eye panoramic image; and generating a binocular stereoscopic panoramic image based on the left-eye panoramic image and the right-eye panoramic image.

In one embodiment, the processor also realizes the following steps when executing the computer program: obtaining a left-eye mapping relationship and a right-eye mapping relationship based on the preset pupil distance and the depth image; the left-eye mapping relationship includes a correspondence between a first coordinate of a pixel point in the panoramic image and a second coordinate of the pixel point in the panoramic screen of the left eye; the right-eye mapping relationship includes a correspondence between the first coordinate and a third coordinate of the pixel point in the panoramic screen of the right eye; and generating the left-eye panoramic image and the right-eye panoramic image by mapping and projecting the panoramic image based on the left-eye mapping relationship and the right-eye mapping relationship respectively. The right-eye mapping relationship includes a correspondence between the first coordinate and a third coordinate of the pixel point in the right-eye panoramic image; according to the left-eye mapping relationship and the right-eye mapping relationship, the panoramic image is mapped and projected respectively to generate a left-eye panoramic image and a right-eye panoramic image.

In one embodiment, the processor further realizes the following steps when executing the computer program: obtaining a second coordinate and a third coordinate based on the depth information, the preset pupil distance, and the first coordinate; determining a correspondence between the first coordinate and the second coordinate as a left-eye mapping relationship; and, determining a correspondence between the first coordinate and the third coordinate as a right-eye mapping relationship.

In one embodiment, the processor executes the computer program further realizing the steps of: according to the formula $$L_\phi(\phi, \theta) = \phi + \arcsin\left(\frac{p}{2 \cdot D(\phi, \theta)}\right)$$

calculating the longitude coordinate in the second coordinates; determining the latitude coordinate in the first coordinates as the latitude coordinate in the second coordinate; wherein $\phi$ is the longitude coordinate in the first coordinate; $\theta$ is the latitude coordinate in the first coordinate, and $D(\phi, \theta)$ is the depth information corresponding to the first coordinate in the depth image, the $L_\phi(\phi, \theta)$ is the longitude coordinate in the second coordinate corresponding to the first coordinate, and p is a preset pupil distance.

In one embodiment, the processor executes the computer program further realizing the steps of: according to the formula $$R_\phi(\phi, \theta) = \phi - \arcsin\left(\frac{p}{2 \cdot D(\phi, \theta)}\right)$$

calculating the longitude coordinate in the third coordinate; determining the latitude coordinate in the first coordinate as the latitude coordinate in the third coordinate; wherein $\phi$ is the longitude coordinate in the first coordinate; $\theta$ is the latitude coordinate in the first coordinate, and $D(\phi, \theta)$ is the depth information corresponding to the first coordinate in the depth image, the $R(\phi, \theta)$ is the longitude coordinate in the third coordinate corresponding to the first coordinate, and p is a preset pupil distance.

In one embodiment, the processor also realizes the following steps when executing the computer program: obtaining a training sample; the training sample includes a panoramic sample image, and a sample depth image corresponding to the panoramic sample image; using the panoramic sample image as a reference input of the initial depth estimation model, using the sample depth image as a reference output of the initial depth estimation model, and training the initial depth estimation model according to a preset loss function to obtain the depth estimation model.

In one embodiment, the processor also realizes the following steps when executing the computer program: executing the step of the method for generating binocular stereoscopic panoramic images, generating binocular stereoscopic panoramic images based on the respective panoramic images in a panoramic video, respectively; and then generating a binocular stereoscopic panoramic video based on the respective binocular stereoscopic panoramic images.

This embodiment provides an electronic device, the embodiment principle and technical effect of which are similar to the above method embodiments and will not be repeated herein.

In one embodiment, a computer-readable storage medium is provided on which a computer program is stored, the computer program being executed by a processor realizing the following steps:

Imputing a panoramic image into a predetermined depth estimation model to obtain a depth image corresponding to the panoramic image, the depth image including depth information corresponding to each pixel point in the panoramic image;

based on the preset pupil distance as well as the depth image, mapping the panoramic image into a left-eye panoramic image and a right-eye panoramic image; and generating a binocular stereoscopic panoramic image based on the left-eye panoramic image and the right-eye panoramic image.

In one embodiment, the computer program, when executed by the processor, also implements the following steps: obtaining a left-eye mapping relationship and a right-eye mapping relationship based on the preset pupil distance and the depth image; the left-eye mapping relationship includes a correspondence between a first coordinate of a pixel point in the panoramic image and a second coordinate of the pixel point in the panoramic screen of the left-eye; the right-eye mapping relationship includes a correspondence between the first coordinate and a third coordinate of the pixel point in the panoramic screen of the right-eye; and generating the left-eye mapping relationship and the right-eye mapping relationship based on the left-eye mapping relationship and the right-eye mapping relationship, respectively. The right-eye mapping relationship includes a correspondence between the first coordinate and a third coordinate of the pixel point in the right eye panoramic image; according to the left-eye mapping relationship and the right-eye mapping relationship, the panoramic image is mapped and projected respectively to generate a left-eye panoramic image and a right-eye panoramic image.

In one embodiment, the computer program is executed by the processor further realizing the following steps: obtaining a second coordinate and a third coordinate based on the depth information, the preset pupil distance, and the first coordinate; determining a correspondence between the first coordinate and the second coordinate as a left-eye mapping relationship; and, determining a correspondence between the first coordinate and the third coordinate as a right-eye mapping relationship.

In one embodiment, the computer program is further implemented when executed by the processor in the steps of: calculating longitude coordinate in the second coordinate according to the formula $$L_\phi(\phi, \theta) = \phi + \arcsin\left(\frac{p}{2 \cdot D(\phi, \theta)}\right);$$

determining the latitude coordinate in the first coordinates as the latitude coordinate in the second coordinate; wherein $\phi$ is the longitude coordinate in the first coordinate; $\theta$ is the latitude coordinate in the first coordinate, and $D(\phi, \theta)$ is the depth information corresponding to the first coordinate in the depth image, the $L_\phi(\phi, \theta)$ is the longitude coordinate in the second coordinate corresponding to the first coordinate, and p is a preset pupil distance.

In one embodiment, the computer program is executed by the processor further realizing the steps of: calculating the longitude coordinate in the third coordinate according to the formula $$R_\phi(\phi, \theta) = \phi - \arcsin\left(\frac{p}{2 \cdot D(\phi, \theta)}\right);$$

determining the latitude coordinate in the first coordinates as the latitude coordinate in the third coordinate; wherein $\phi$ is the longitude coordinate in the first coordinate; $\theta$ is the latitude coordinate in the first coordinate, and $D(\phi, \theta)$ is the depth information corresponding to the first coordinate in the depth image, the $R_\phi(\phi, \theta)$ is the longitude coordinate in the third coordinate corresponding to the first coordinate, and p is a preset pupil distance.

In one embodiment, the computer program is executed by the processor with the following steps: obtaining a training sample; the training sample includes a panoramic sample image, and a sample depth image corresponding to the panoramic sample image; using the panoramic sample image as a reference input of the initial depth estimation model, using the sample depth image as a reference output of the initial depth estimation model, and training the initial depth estimation model according to a predetermined loss function to obtain the depth estimation model.

In one embodiment, the computer program, when executed by the processor, also realizes the following steps: performing the step of the method for generating binocular stereoscopic panoramic images, generating binocular stereoscopic panoramic images based on the respective panoramic images in a panoramic video, respectively; and then generating a binocular stereoscopic panoramic video based on the respective binocular stereoscopic panoramic images.

This embodiment provides a computer-readable storage medium, the embodiment principle and technical effect of which are similar to the above method embodiments and will not be repeated herein.

In one embodiment, there is provided a computer program product comprising a computer program that implements the following steps when executed by a processor:

Inputting a panoramic image into a predetermined depth estimation model to obtain a depth image corresponding to the panoramic image, the depth image including depth information corresponding to each pixel point in the panoramic image;

based on the preset pupil distance as well as the depth image, mapping the panoramic image into a left-eye panoramic image and a right-eye panoramic image; and generating a binocular stereo panoramic image based on the left-eye panoramic image and the right-eye panoramic image.

In one embodiment, the computer program, when executed by the processor, also implements the following steps: obtaining a left-eye mapping relationship and a right-eye mapping relationship based on the preset pupil distance and the depth image; the left-eye mapping relationship includes a correspondence between a first coordinate of a pixel point in the panoramic image and a second coordinate of the pixel point in the panoramic screen of the left-eye; the right-eye mapping relationship includes a correspondence between the first coordinate and a third coordinate of the pixel point in the panoramic screen of the right-eye; and generating the left-eye mapping relationship and the right-eye mapping relationship based on the left-eye mapping relationship and the right-eye mapping relationship, respectively. The right-eye mapping relationship includes a correspondence between the first coordinate and a third coordinate of the pixel point in the right-eye panoramic image; according to the left-eye mapping relationship and the right-eye mapping relationship, the panoramic image is mapped and projected respectively to generate a left-eye panoramic image and a right-eye panoramic image.

In one embodiment, the computer program is executed by the processor further realizing the following steps: the root obtains a second coordinate and a third coordinate based on the depth information, the predetermined pupil distance, and the first coordinate; determines a correspondence between the first coordinate and the second coordinate as a left-eye mapping relationship; and, determines a correspondence between the first coordinate and the third coordinate as a right-eye mapping relationship.

In one embodiment, the computer program is further implemented when executed by the processor in the steps of: calculating a longitude coordinate in the second coordinate according to the formula $$L_\phi(\phi, \theta) = \phi + \arcsin\left(\frac{p}{2 \cdot D(\phi, \theta)}\right);$$

determining the latitude coordinate in the first coordinate as the latitude coordinate in the second coordinate; wherein $\phi$ is the longitude coordinate in the first coordinate; $\theta$ is the latitude coordinate in the first coordinate, and $D(\phi, \theta)$ is the depth information corresponding to the first coordinate in the depth image, the $L_\phi(\phi, \theta)$ is the longitude coordinate in the second coordinate corresponding to the first coordinate, and p is a preset pupil distance.

In one embodiment, the computer program is further implemented when executed by the processor in the steps of: calculating the longitude coordinate in the third coordinates according to the formula $$R_{\phi}(\phi, \theta) = \phi - \arcsin\left(\frac{p}{2 \cdot D(\phi, \theta)}\right);$$

determining the latitude coordinate in the first coordinate as the latitude coordinate in the third coordinate; wherein ϕ is the longitude coordinate in the first coordinate; θ is the latitude coordinate in the first coordinate, and D(ϕ, θ) is the depth information corresponding to the first coordinate in the depth image, the R (ϕ, θ) is the longitude coordinate in the third coordinate corresponding to the first coordinate, and p is a preset pupil distance.

In one embodiment, the computer program is executed by the processor with the following steps: obtaining a training sample; the training sample includes a panoramic sample image, and a sample depth image corresponding to the panoramic sample image; using the panoramic sample image as a reference input of the initial depth estimation model, using the sample depth image as a reference output of the initial depth estimation model, and training the initial depth estimation model according to the predetermined loss function to obtain the depth estimation model.

In one embodiment, the computer program, when executed by the processor, also realizes the following steps: performing the step of the method for generating binocular stereoscopic panoramic images, generating binocular stereoscopic panoramic images based on the respective panoramic images in the panoramic video, respectively; and then generating a binocular stereoscopic panoramic video based on the respective binocular stereoscopic panoramic images.

This embodiment provides a computer program product, the embodiment principle and technical effect of which are similar to the above method embodiments and will not be repeated herein.

A person of ordinary skill in the art may understand that realizing all or part of the processes in the methods of the above embodiments is possible by means of a computer program to instruct the relevant hardware to accomplish the same, and the computer program may be stored in a non-volatile computer-readable storage medium, which computer program, when executed, may comprise processes such as the processes of the embodiments of the respective methods described above. Among other things, any reference to a memory, database, or other medium used in the embodiments provided in this application may include at least one of non-volatile and volatile memory. Non-volatile memories may include Read-Only Memory (ROM), magnetic tape, floppy disk, flash memory, optical memory, high-density embedded non-volatile memories, Resistance-Resistive Memory (ReRAM), Magnetoresistive Random Access Memory (MRAM), Ferroelectric Memory (ReRAM, Magnetoresistive Random Access Memory (MRAM), Ferroelectric Random Access Memory (FRAM), Phase Change Memory (PCM), Graphene Memory and so on. The volatile memory may include a Random Access Memory (RAM) or an external cache memory, and the like. As an illustration and not as a limitation, the RAM may be in various forms, such as Static Random Access Memory (SRAM) or Dynamic Random Access Memory (DRAM), and the like. The databases involved in the embodiments provided in the present application may include at least one of a relational database and a non-relational database. The non-relational database may include a blockchain-based distributed database and the like, without limitation. The processor involved in the embodiments provided in the present application may be a general-purpose processor, a central processing unit, a graphics processor, a digital signal processor, a programmable logician, a data processing logician based on quantum computing, circuitry, and the like, without limitation.

The various technical features of the above embodiments can be combined in any way, and all possible combinations of the various technical features of the above embodiments have not been described for the sake of conciseness of description; however, as long as there is no contradiction in the combinations of these technical features, they should all be considered to be within the scope of the specification as recorded herein.

The above-described embodiments express only several embodiments of the present application, which are described in a more specific and detailed manner, but are not to be construed as a limitation of the scope of the patent of the present application. It should be pointed out that for a person of ordinary skill in the art, several deformations and improvements can be made without departing from the conception of the present application, which all fall within the scope of protection of the present application. Therefore, the scope of protection of this application shall be subject to the attached claims.

What is claimed is:

1. A method for generating a binocular stereoscopic panoramic image, comprising:

inputting a panoramic image into a predetermined depth estimation model to obtain a depth image corresponding to the panoramic image, the depth image including depth information corresponding to each pixel point in the panoramic image;

mapping the panoramic image into a left-eye panoramic image and a right-eye panoramic image based on a preset pupil distance and the depth image; and generating a binocular stereoscopic panoramic image based on the left-eye panoramic image and the right-eye panoramic image, wherein the mapping the panoramic image into the left-eye panoramic image and the right-eye panoramic image based on the preset pupil distance and the depth image comprises:

obtaining a left-eye mapping relationship and a right-eye mapping relationship based on the preset pupil distance and the depth image; the left-eye mapping relationship comprising a correspondence between a first coordinate of a pixel point in the panoramic image and a second coordinate of the pixel point in the left-eye panoramic image; the right-eye mapping relationship comprising a correspondence between the first coordinate and a third coordinate of the pixel point in the right-eve panoramic image; and mapping and projecting the panoramic image separately to generate the left-eye panoramic image and the right-eye panoramic image according to the left-eye mapping relationship and the right-eye mapping relationship.

2. The method according to claim 1, wherein the obtaining the left-eye mapping relationship and the right-eye mapping relationship based on the preset pupil distance and the depth image comprises:

obtaining the second coordinate and the third coordinate based on the depth information, the preset pupil distance, and the first coordinate;

determining the correspondence between the first coordinate and the second coordinate as the left-eye mapping relationship; and determining the correspondence between the first coordinate and the third coordinate as the right-eye mapping relationship.

3. The method according to claim 2, wherein the obtaining the second coordinate based on the depth information, the preset pupil distance, and the first coordinate comprises:

determining a longitude coordinate in the second coordinate according to formula $$L_\phi(\phi, \theta) = \phi + \arcsin\left(\frac{p}{2 \cdot D(\phi, \theta)}\right); \text{ and}$$

determining a latitude coordinate in the first coordinate as a latitude coordinate in the second coordinate;

wherein $\phi$ is a longitude coordinate in the first coordinate; $\theta$ is a latitude coordinate in the first coordinate, and $D(\phi, \theta)$ is depth information corresponding to the first coordinate in the depth image, $L_\phi(\phi, \theta)$ is a longitude coordinate in a second coordinate corresponding to the first coordinate, and p is the preset pupil distance.

4. The method according to claim 2, wherein the obtaining the third coordinate based on the depth information, the preset pupil distance, and the longitude coordinate in the first coordinate comprises:

determining a longitude coordinate in the third coordinate according to formula $$R_\phi(\phi, \theta) = \phi - \arcsin\left(\frac{p}{2 \cdot D(\phi, \theta)}\right); \text{ and}$$

determining a latitude coordinates in the first coordinates as a latitude coordinate in the third coordinate;

wherein $\phi$ is a longitude coordinate in the first coordinate; $\theta$ is a latitude coordinate in the first coordinate, and $D(\phi, \theta)$ is depth information corresponding to the first coordinate in the depth image, $R_\phi(\phi, \theta)$ is a longitude coordinate in a third coordinate corresponding to the first coordinate, and p is the predetermined pupil distance.

5. The method according to claim 1, further comprising:

obtaining a training sample; the training sample comprising a panoramic sample image and a sample depth image corresponding to the panoramic sample image; and training the initial depth estimation model according to a predetermined loss function to obtain the depth estimation model with the panoramic sample image as a reference input of an initial depth estimation model and the sample depth image as a reference output of the initial depth estimation model.

6. A system for generating a binocular stereoscopic panoramic image, comprising one or more physical processors configured by machine-readable instructions to:

obtain a depth image corresponding to a panoramic image; the depth image includes depth information corresponding to each pixel point in the panoramic image;

map the panoramic image into a left-eye panoramic image and a right-eye panoramic image based on a preset pupil distance and the depth image; and generate a binocular stereo panoramic image based on the left-eye panoramic image and the right-eye panoramic image, wherein the mapping the panoramic image into the left-eye panoramic image and the right-eye panoramic image based on the preset pupil distance and the depth image comprises:

obtaining a left-eye mapping relationship and a right-eye mapping relationship based on the preset pupil distance and the depth image; the left-eye mapping relationship comprising a correspondence between a first coordinate of a pixel point in the panoramic image and a second coordinate of the pixel point in the left-eye panoramic image: the right-eye mapping relationship comprising a correspondence between the first coordinate and a third coordinate of the pixel point in the right-eye panoramic image; and mapping and projecting the panoramic image separately to generate the left-eye panoramic image and the right-eye panoramic image according to the left-eye mapping relationship and the right-eye mapping relationship.

7. The system according to claim 6, wherein the obtaining a depth image corresponding to a panoramic image comprises:

inputting a panoramic image into a predetermined depth estimation model to obtain a depth image corresponding to the panoramic image.

8. The system according to claim 7, further comprising:

training circuitry configured to:

obtain a training sample; the training sample comprising a panoramic sample image and a sample depth image corresponding to the panoramic sample image; and train the initial depth estimation model according to a predetermined loss function to obtain the depth estimation model with the panoramic sample image as a reference input of an initial depth estimation model and the sample depth image as a reference output of the initial depth estimation model.

9. The system according to claim 6, wherein the obtaining the left-eye mapping relationship and the right-eye mapping relationship based on the preset pupil distance and the depth image comprises:

obtaining the second coordinate and the third coordinate based on the depth information, the preset pupil distance, and the first coordinate;

determining the correspondence between the first coordinate and the second coordinate as the left-eye mapping relationship; and determining the correspondence between the first coordinate and the third coordinate as the right-eye mapping relationship.

10. The system according to claim 9, wherein the obtaining the second coordinate based on the depth information, the preset pupil distance, and the first coordinate comprises:

determining a longitude coordinate in the second coordinate according to formula $$L_\phi(\phi, \theta) = \phi + \arcsin\left(\frac{p}{2 \cdot D(\phi, \theta)}\right); \text{ and}$$

determining a latitude coordinate in the first coordinate as a latitude coordinate in the second coordinate;

wherein $\phi$ is a longitude coordinate in the first coordinate; $\theta$ is a latitude coordinate in the first coordinate, and $D(\phi, \theta)$ is depth information corresponding to the first coordinate in the depth image, $L_\phi(\phi, \theta)$ is a longitude coordinate in a second coordinate corresponding to the first coordinate, and p is the preset pupil distance.

11. The system according to claim 9, wherein the obtaining the third coordinate based on the depth information, the preset pupil distance, and the longitude coordinate in the first coordinate comprises:

determining a longitude coordinate in the third coordinate according to formula $$R_\phi(\phi, \theta) = \phi - \arcsin\left(\frac{p}{2 \cdot D(\phi, \theta)}\right);\text{ and}$$

determining a latitude coordinates in the first coordinates as a latitude coordinate in the third coordinate;

wherein φ is a longitude coordinate in the first coordinate; θ is a latitude coordinate in the first coordinate, and D(φ, θ) is depth information corresponding to the first coordinate in the depth image, $R_\phi(\phi, \theta)$ is a longitude coordinate in a third coordinate corresponding to the first coordinate, and p is the predetermined pupil distance.

12. An electronic device comprising a memory and a processor, the memory storing a computer program, wherein the processor, when executing the computer program, implements steps of:

obtaining a depth image corresponding to a panoramic image, the depth image including depth information corresponding to each pixel point in the panoramic image;

mapping the panoramic image into a left-eye panoramic image and a right-eye panoramic image based on a preset pupil distance and the depth image; and generating a binocular stereoscopic panoramic image based on the left-eye panoramic image and the right-eye panoramic image, wherein the mapping the panoramic image into the left-eye panoramic image and the right-eye panoramic image based on the preset pupil distance and the depth image comprises:

obtaining a left-eye mapping relationship and a right-eye mapping relationship based on the preset pupil distance and the depth image; the left-eye mapping relationship comprising a correspondence between a first coordinate of a pixel point in the panoramic image and a second coordinate of the pixel point in the left-eye panoramic image: the right-eye mapping relationship comprising a correspondence between the first coordinate and a third coordinate of the pixel point in the right-eye panoramic image; and mapping and projecting the panoramic image separately to generate the left-eye panoramic image and the right-eye panoramic image according to the left-eye mapping relationship and the right-eye mapping relationship.

13. The electronic device according to claim 12, wherein the obtaining the left-eye mapping relationship and the right-eye mapping relationship based on the preset pupil distance and the depth image comprises:

obtaining the second coordinate and the third coordinate based on the depth information, the preset pupil distance, and the first coordinate;

determining the correspondence between the first coordinate and the second coordinate as the left-eye mapping relationship; and determining the correspondence between the first coordinate and the third coordinate as the right-eye mapping relationship.

14. The electronic device according to claim 13, wherein the obtaining the second coordinate based on the depth information, the preset pupil distance, and the first coordinate comprises:

determining a longitude coordinate in the second coordinate according to formula $$L_\phi(\phi, \theta) = \phi + \arcsin\left(\frac{p}{2 \cdot D(\phi, \theta)}\right);\text{ and}$$

determining a latitude coordinate in the first coordinate as a latitude coordinate in the second coordinate;

wherein φ is a longitude coordinate in the first coordinate; θ is a latitude coordinate in the first coordinate, and D(φ, θ) is depth information corresponding to the first coordinate in the depth image, $L_\phi(\phi, \theta)$ is a longitude coordinate in a second coordinate corresponding to the first coordinate, and p is the preset pupil distance.

15. The electronic device according to claim 13, wherein the obtaining the third coordinate based on the depth information, the preset pupil distance, and the longitude coordinate in the first coordinate comprises:

determining a longitude coordinate in the third coordinate according to formula:

$$R_\phi(\phi, \theta) = \phi - \arcsin\left(\frac{p}{2 \cdot D(\phi, \theta)}\right);\text{ and}$$

determining a latitude coordinates in the first coordinates as a latitude coordinate in the third coordinate;

wherein φ is a longitude coordinate in the first coordinate; θ is a latitude coordinate in the first coordinate, and D(φ, θ) is depth information corresponding to the first coordinate in the depth image, $R_\phi(\phi, \theta)$ is a longitude coordinate in a third coordinate corresponding to the first coordinate, and p is the predetermined pupil distance.

* * * * *